United States Patent
Wiktor et al.

(10) Patent No.: US 6,819,577 B1
(45) Date of Patent: Nov. 16, 2004

(54) DISTRIBUTING CLOCK AND PROGRAMMING PHASE SHIFT IN MULTIPHASE PARALLELABLE CONVERTERS

(75) Inventors: Stefan Wlodzimierz Wiktor, Raliegh, NC (US); Vladimir Alexander Muratov, Manchester, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/440,784

(22) Filed: May 19, 2003

(51) Int. Cl.[7] .................................................. G05F 1/40

(52) U.S. Cl. .................... 363/272; 363/65; 323/282

(58) Field of Search ............................... 323/268, 272, 323/282, 350, 351; 363/65

(56) References Cited

U.S. PATENT DOCUMENTS

| | | | | |
|---|---|---|---|---|
| 4,174,534 A | * | 11/1979 | Kotlarewsky | ................. 363/26 |
| 5,793,628 A | * | 8/1998 | Koch | .......................... 363/152 |
| 6,285,571 B1 | * | 9/2001 | Brooks et al. | ................. 363/65 |
| 6,362,608 B1 | | 3/2002 | Ashburn et al. | ............. 323/272 |
| 6,476,589 B2 | | 11/2002 | Umminger et al. | .......... 323/282 |

OTHER PUBLICATIONS

*Multi–Topology High–Frequency PWM Controller*, Texas Instruments, TPS43000, SLUS489, Oct. 2001, pp. 1–26.
*Designing With the TL5001 PWM Controller*, Application Report, Texas Instruments, SLVA034A, 1995, pp. 1–40.

\* cited by examiner

*Primary Examiner*—Michael Sherry
*Assistant Examiner*—Gary L. Laxton
(74) *Attorney, Agent, or Firm*—W. Daniel Swayze, Jr.; W. James Brady; Frederick J. Telecky, Jr.

(57) ABSTRACT

A highly efficient multi-phase power system having both reduced size and reduced cost. The multi-phase power system includes a plurality of Pulse Width Modulation (PWM) controllers. A first controller is programmed to function as a "master" controller, and the remaining controller(s) are programmed to function as "slave" controllers. Each controller includes a synchronous counter and control logic circuitry. The control logic generates at least one synchronization output signal based on the outputs of the counter and the programming state (i.e., master or slave) of the controller. The master controller generates a master clock signal having a synchronizing state encoded thereon and provides the master clock to the slave controller, which includes synchronization circuitry for receiving the master clock and resetting the counter based on the synchronizing state of the master clock, thereby assuring that appropriate phase relationships are maintained between the controller outputs.

13 Claims, 4 Drawing Sheets

"DISTRIBUTING CLOCK AND
PROGRAMMING PHASE SHIFT IN
MULTIPHASE PARALLELABLE
CONVERTERS

CROSS REFERENCE TO RELATED
APPLICATIONS

N/A

STATEMENT REGARDING FEDERALLY
SPONSORED RESEARCH OR DEVELOPMENT

N/A

BACKGROUND OF THE INVENTION

The present application relates generally to multi-phase power systems, and more specifically to improved circuits and methods of synchronizing controllers employed in such systems.

In recent years, there has been a sharp increase in the demand for electrical and electronic products that are smaller, use less power, require less Printed Circuit Board (PCB) space, and are less costly. For this reason, small low-power multi-phase power systems have been increasingly employed in the power supplies of such electronic products and devices. For example, multi-phase power systems may be used to implement multi-phase power converters such as high frequency DC-to-DC converters.

Some conventional multi-phase power systems typically include a plurality of multi-phase controllers and associated synchronization circuitry. For example, each multi-phase controller may comprise an LTC1629 "poly-phase" controller, which is sold by Linear Technology, Inc., Milpitas, Calif., U.S.A. In such a multi-phase power system, a Phase-Locked Loop (PLL) circuit is typically used to synchronize the clocks and phases of the controllers, and to assure that appropriate phase shifts are achieved among the several controllers. In this way, potentially harmful parasitic interactions between the controllers are reduced, and the efficiency of the multi-phase power system is increased.

One drawback of the above-described conventional multi-phase power system is that the PLL-based approach to synchronizing the controllers generally produces jitter, which can cause a significant amount of noise to appear at the system output. Further, the PLL synchronization circuit normally requires a significant amount of time to lock-on the desired clock frequency. Moreover, the total pin count of each controller package is relatively high, and the PLL circuit for synchronizing the controllers typically comprises a number of discrete components. As a result, the amount of PCB space needed to implement the multi-phase power system within an electrical or electronic product is increased, which can lead to significant increases in the electronic product's overall size and cost.

It would therefore be desirable to have a multi-phase power system implementation that overcomes the drawbacks of the above-described conventional systems and methods.

BRIEF SUMMARY OF THE INVENTION

In accordance with the present invention, a highly efficient multi-phase power system is provided that has both reduced size and reduced cost. The presently disclosed multi-phase power system achieves such size and cost reductions by employing a simplified synchronization technique that includes directly synchronizing a plurality of controllers within the system to a single master clock.

In one embodiment, the multi-phase power system includes a plurality of programmable multi-phase controllers. A first controller is programmed to function as a "master" controller, and the remaining controller(s) are programmed to function as "slave" controllers. Each of the controllers includes a synchronous counter and control logic circuitry. The control logic is operatively coupled to the synchronous counter to generate at least one synchronization output signal based on the outputs of the counter and the programming state (i.e., master or slave) of the controller.

In the presently disclosed embodiment, the master controller is configured to generate a master clock signal having a synchronizing state encoded thereon. The master controller encodes the synchronizing state on the master clock signal by conceptually skipping one or more predetermined cycles of the clock. By encoding the synchronizing state on the master clock signal, the master controller effectively inserts one or more synchronizing pulses into the clock signal. The master controller provides the master clock signal to each of the slave controllers. Each slave controller includes synchronization circuitry configured to receive the master clock signal, and to reset the synchronous counter included therein based on the synchronizing state of the master clock, thereby assuring that appropriate phase relationships are maintained between the respective controller outputs.

By directly synchronizing the clocks and phases of a plurality of controllers to a single master clock, a smaller and less costly multi-phase power system can be achieved without reducing the efficiency of the power system.

Other features, functions, and aspects of the invention will be evident from the Detailed Description of the Invention that follows.

BRIEF DESCRIPTION OF THE SEVERAL
VIEWS OF THE DRAWINGS

The invention will be more fully understood with reference to the following Detailed Description of the Invention in conjunction with the drawings of which:

DETAILED DESCRIPTION OF THE
INVENTION

A highly efficient multi-phase power system is disclosed that has reduced size requirements and reduced cost. The presently disclosed multi-phase power system employs a synchronization technique that directly synchronizes a plurality of controllers included in the system to a single master clock.

Figure 1:
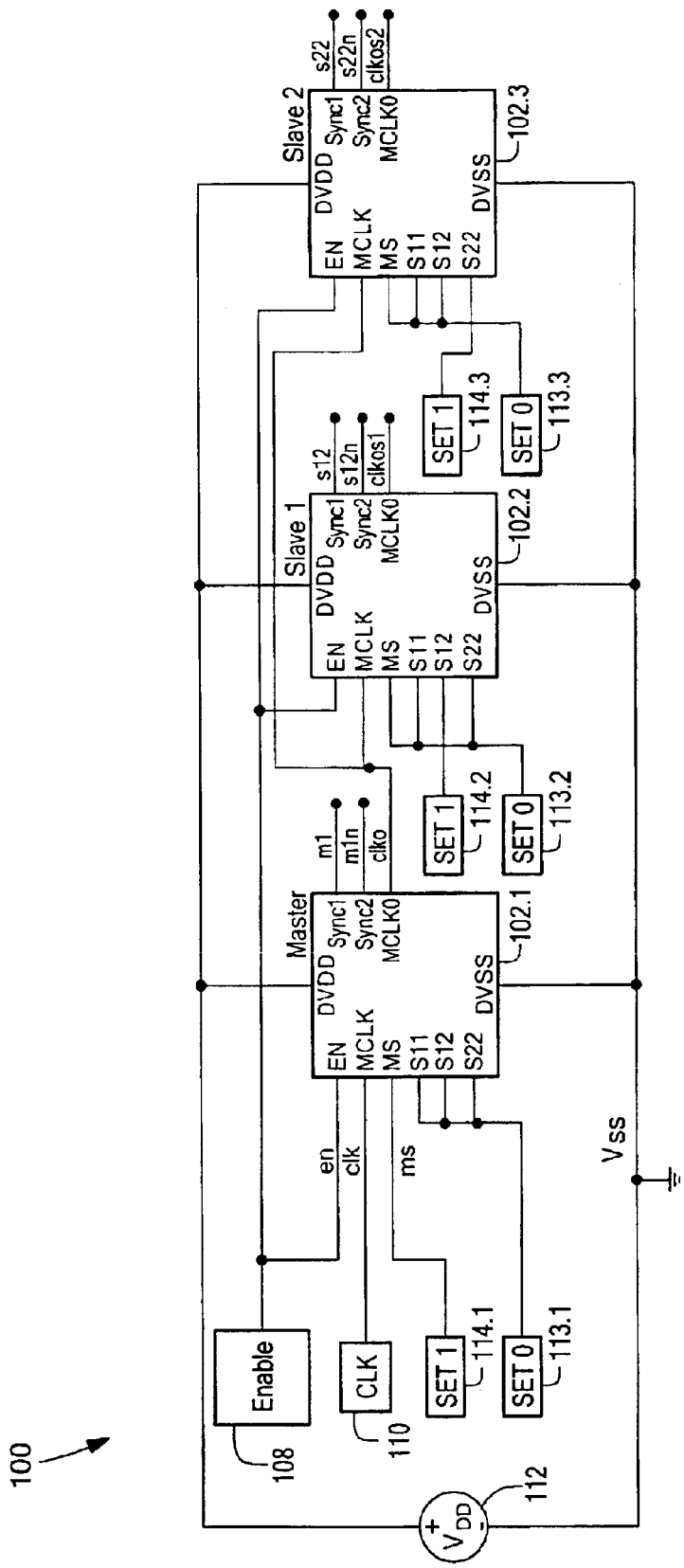
FIG. 1 is a schematic diagram illustrating a multi-phase power system according to the present invention.

FIG. 1 depicts an illustrative embodiment of a multi-phase power system 100, in accordance with the present invention. In the illustrated embodiment, the multi-phase power system 100 includes a plurality of programmable multi-phase controllers 102.1–102.3, a clock generator 110, a voltage source ($V_{DD}$) 112, enable logic circuitry 108, and control logic circuitry 113.1–113.3 and 114.1–114.3. As shown in FIG. 1, the multi-phase controllers 102.1–102.3 are dual-channel controllers configured to produce synchronization signals over respective output channels Sync1–Sync2. Accordingly, the multi-phase power system 100 of FIG. 1 including the three dual-channel controllers 102.1–102.3 forms a six-phase power system.

In the preferred embodiment, each of the multi-phase controllers 102.1–102.3 comprises a respective multi-phase Pulse Width Modulation (PWM) controller. It should be understood, however, that the multi-phase controllers 102.1–102.3 may comprise any suitable type of controller having any suitable number of channels. For example, the multi-phase power system 100 may alternatively employ a plurality of single channel controllers at minimal configuration. Further, the multi-phase power system 100 may include any suitable number of controllers. The multi-phase power system 100 includes the three dual-channel multi-phase PWM controllers 102.1–102.3 for purposes of illustration.

As shown in FIG. 1, the multi-phase controller 102.1 is designated as the "Master" controller, and the multi-phase controllers 102.2–102.3 are designated as the "Slave 1" and "Slave 2" controllers, respectively. The clock generator 110 is configured to provide a clock signal "clk" to an MCLK input of the Master controller 102.1, and the Master controller 102.1 in turn provides a master clock signal "clko" at an MCLKO output to the corresponding MCLK inputs of the respective Slave controllers 102.2–102.3. In the presently disclosed embodiment, the clocks and phases of the Slave controllers 102.2–102.3 are directly synchronized to the Master controller 102.1 via the single master clock clko. It is noted that each of the multi-phase controllers 102.1–102.3 is operatively coupled to the voltage source 112 and to a ground connection ($V_{SS}$). Moreover, each multi-phase controller 102.1–102.3 is put into an operational state via an enable signal "en" generated by the enable logic 108 and applied to a respective EN input of the controller.

As described above, the multi-phase controllers 102.1–102.3 are designated as the Master, Slave 1, and Slave 2 controllers, respectively. Each of the multi-phase controllers 102.1–102.3 are programmed to perform predetermined "master" or "slave" functions via the control logic 113.1–113.3 and 114.1–114.3. Specifically, the control logic 114.1 is configured to apply a first predetermined logic level "ms", e.g., a "high" logic level to an MS input of the Master controller 102.1, and the control logic 113.2–113.3 are configured to apply second predetermined logic levels, e.g., "low" logic levels to the corresponding MS inputs of the Slave controllers 102.2–102.3, respectively.

As further described above, the clocks and phases of the Slave controllers 102.2–102.3 are directly synchronized to the single master clock clko generated by the Master controller 102.1. In the preferred embodiment, the total phase shift across the respective synchronization outputs Sync1–Sync2 of the multi-phase controllers 102.1–102.3 is equal to 180°. Accordingly, the phase shift between the synchronization signals "m1" and "m1n" generated by the Master controller 102.1 is equal to 180°. Similarly, the phase shift between the synchronization signals "s12" and "s12n" generated by the Slave controller 102.2, and the phase shift between the synchronization signals "s22" and "s22n" generated by the Slave controller 102.3 are equal to 180°, respectively.

Figure 3:
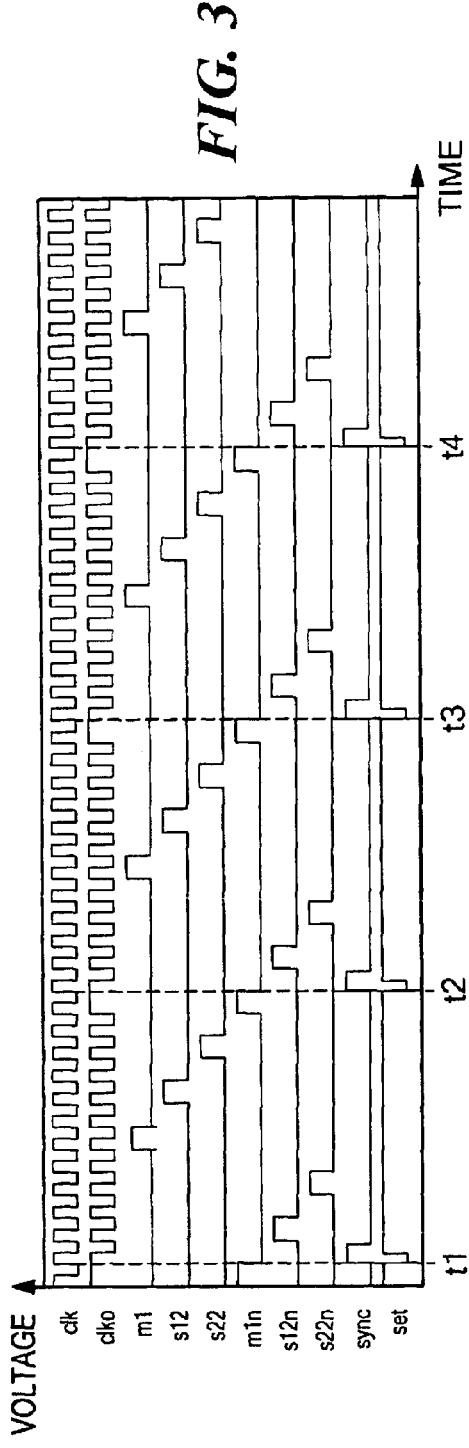
FIG. 3 is a timing diagram illustrating representative signals in the multi-phase power system of FIG. 1.

The timing diagram of FIG. 3 depicts the phase relationships between the synchronization signals m1, s12, s22, m1n, s12n, and s22n generated by the multi-phase controllers 102.1–102.3. As indicated in FIG. 3, the phase shift between the signals m1 and s12, the phase shift between the signals s12 and s22, and the phase shift between the signals s22 and m1n are equal to 60°, respectively. Similarly, the phase shift between the signals m1n and s12n, the phase shift between the signals s12n and s22n, and the phase shift between the signals s22n and m1 are equal to 60°, respectively. Accordingly, as described above, the phase shift between the signals m1 and m1n, the phase shift between the signals s12 and s12n, and the phase shift between the signals s22 and s22n are equal to 180° (60°×3=180°), respectively.

In the presently disclosed embodiment, the multi-phase power system 100 (see FIG. 1) is programmed to provide predetermined phase shifts, e.g., 60° phase shifts between the respective multi-phase controllers 102.1–102.3 via the control logic 113.1–113.3 and 114.1–114.3. Specifically, the control logic 113.1 is configured to assign the 0° phase position to the Master controller 102.1 by applying, e.g., low logic levels to inputs S11, S12, and S22 of the controller 102.1; the control logic 113.2 and 114.2 are configured to assign the 60° phase position to the Slave controller 102.2 by applying, e.g., low logic levels to the inputs S11 and S22 and a high logic level to the input S12 of the controller 102.2; and the control logic 113.3 and 114.3 are configured to assign the 120° phase position to the Slave controller 102.3 by applying, e.g., low logic levels to the inputs S11 and S12 and a high logic level to the input S22 of the controller 102.3.

Figure 2:
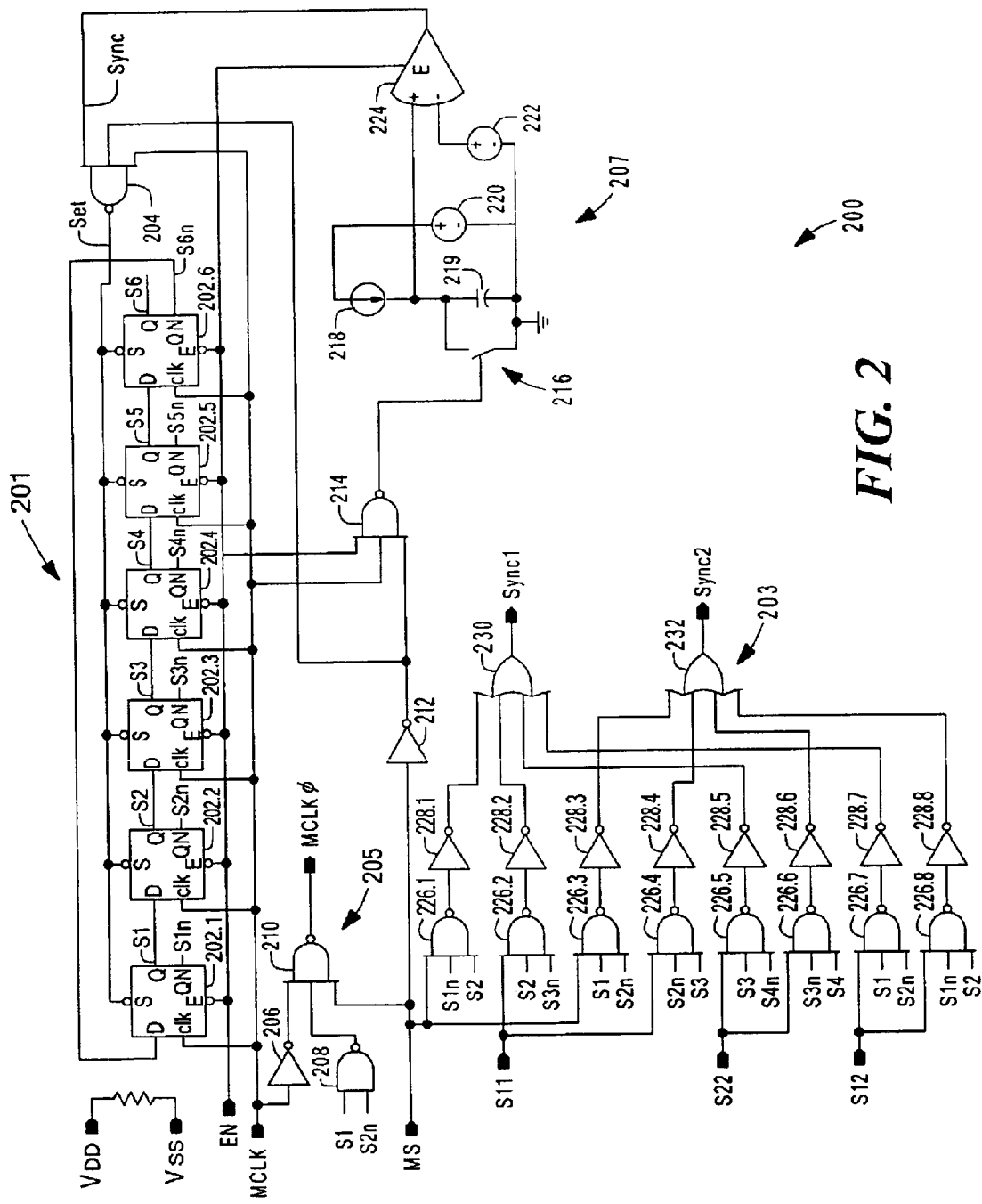
FIG. 2 is a schematic diagram illustrating one of a plurality of multi-phase controllers included in the multi-phase power system of FIG. 1.

FIG. 2 depicts an illustrative embodiment 200 of one of the plurality of multi-phase controllers 102.1–102.3 included in the multi-phase power system 100 (see FIG. 1). It is noted that the multi-phase controllers 102.1–102.3 are substantially alike. In the illustrated embodiment, the multi-phase controller 200 comprises a synchronous counter 201, control logic circuitry 203, clock logic circuitry 205, and a synchronization ("sync") circuit 207. The counter 201 includes a plurality of D-Flip-Flops (DFF) 202.1–202.6 suitably arranged to form the synchronous counter. Each of the DFFs 202.1–202.6 receives the enable signal en generated by the enable logic 108 at its EN input and the master clock signal clko generated by the Master controller 102.1 (see FIG. 1) at its MCLK input. Further, each DFF 202.1–202.6 provides two outputs, e.g., the DFF 202.1 provides the outputs s1 and s1n (the inverse of s1). Similarly, the DFF 202.2 provides the outputs s2 and s2n, the DFF 202.3 provides the outputs s3 and s3n, the DFF 202.4 provides the outputs s4 and s4n, the DFF 202.5 provides the outputs s5 and s5n, and the DFF 202.6 provides the outputs s6 and s6n.

The control logic 203 includes a plurality of NAND gates 226.1–226.8, a plurality of inverters 228.1–228.8, and a plurality of OR gates 230 and 232. The NAND gates 226.1–226.8 receive the outputs (i.e., the outputs s1, s1n, s2, s2n, s3, s3n, s4, s4n, s5, s5n, s6, and/or s6n) provided by the counter 201. Further, the NAND gates 226.2 and 226.4–226.8 receive the logic levels provided by the control logic 113.1–113.3 and 114.1–114.3 at the respective inputs S11, S12, and S22, and the NAND gates 226.1 and 226.3 receive logic levels indicative of the programming state (i.e., master or slave) of the controller at the input MS. The NAND gates 226.1–226.8, the inverters 228.1–228.8, and the OR gates 230 and 232 are suitably arranged to generate synchronization signals such as the signals m1 and m1n, s12 and s12n, or s22 and s22n (see FIG. 1) over the respective output channels Sync1–Sync2.

The clock logic circuitry 205 includes an inverter 206, a NAND gate 208, and a NAND gate 210. As described above, the Master controller 102.1 receives the clock signal clk generated by the clock generator 110 at its MCLK input, and provides the master clock signal clko at its MCLKO output to the corresponding MCLK inputs of the Slave controllers 102.2–102.3 (see also FIG. 1). Accordingly, the operation of the clock logic circuitry 205 is dependent upon the programming state (i.e., master or slave) of the controller.

In the event the multi-phase controller 200 is programmed to be the Master controller (e.g., a high logic level is applied to the MS input), the NAND gate 210 is enabled. Further, the inverter 206 receives the clock signal clk at the MCLK input, and the NAND gate 208 receives the s1 and s2$n$ outputs from the counter 201. The inverter 206 and the NAND gate 208 provide their respective outputs to the NAND gate 210, which generates the master clock signal clko at the MCLKO output. In this way, the Master controller encodes a synchronizing state on the master clock signal. The use of the synchronizing state by the multi-phase power system is described below. In the event the multi-phase controller 200 is programmed to be a Slave controller (e.g., a low logic level is applied to the MS input), the NAND gate 210 is disabled and no clock signal is provided at the MCLKO output.

As shown in FIG. 2, the sync circuit 207 includes an inverter 212, a NAND gate 214, a switch 216, a current source 218, a capacitor 219, voltage sources 220 and 222, a comparator 224, and a NAND gate 204. The NAND gate 214 and the comparator 224 each receive the enable signal en generated by the enable logic 108 (see FIG. 1). As described above, the clocks and phases of the Slave controllers 102.2–102.3 (see FIG. 1) are directly synchronized to the Master controller 102.1 via the master clock signal clko. Accordingly, like the clock logic circuitry 205, the operation of the sync circuit 207 is dependent upon the programming state (i.e., master or slave) of the controller.

The NAND gate 214 receives the enable signal en generated by the enable logic 108 and the master clock signal clko generated by the Master controller 102.1 (see FIG. 1). In the event the multi-phase controller 200 is programmed to be a Slave controller (e.g., a low logic level is applied to the MS input), the inverter 212 provides a high logic level to the NAND gate 214 to enable the gate 214. It should be noted that the clock logic circuitry 205 of the Slave controller is disabled. The output of the NAND gate 214 de-activates/activates the switch 216 to charge/discharge the capacitor 219. In the event the multi-phase controller 200 is programmed to be a Master controller (e.g., a high logic level is applied to the MS input), the inverter 212 provides a low logic level to the NAND gate 214 to disable the gate 214, thereby disabling the sync circuit 207.

As described above, the master clock signal clko generated by the Master controller 102.1 (see FIG. 1) has a synchronizing state encoded thereon. The Master controller 102.1 encodes the synchronizing state on the master clock signal clko by conceptually skipping one or more predetermined cycles of the clock clk, e.g., every $12^{th}$ clock cycle. By encoding the synchronizing state on the master clock signal clko, the Master controller 102.1 effectively inserts one or more synchronizing pulses into the clock signal. The sync circuit 207 of the Slave controller 102.2–102.3 is configured to detect the synchronizing state encoded on the master clock signal clko. Further, in response to the synchronizing state, the sync circuit 207 is configured to generate a sync signal for directly synchronizing the Slave controller to the master clock signal clko.

The timing diagram of FIG. 3 depicts the clock signal clk generated by the clock generator 110 (see FIG. 1), the master clock signal clko generated by the Master controller 102.1, and the sync signal generated by the comparator 224 (see FIG. 2). As shown in FIG. 3, the synchronizing state is encoded on the master clock signal clko by conceptually skipping every $12^{th}$ cycle of the clock. In the presently disclosed embodiment, the master clock signal clko is at a high logic level for the entire $12^{th}$ clock cycle. In effect, positive synchronizing pulses each having a duration of about 1½ cycles of the master clock are inserted into the master clock signal at the start of every $12^{th}$ cycle of the clock. It is understood that the synchronizing state may alternatively comprise one or more negative pulses inserted into the master clock signal, and that the duration of each synchronizing pulse may be a suitable fraction or multiple of a clock cycle.

It should further be appreciated that in the event the multi-phase controller 200 is programmed to be a Slave controller, the clock signal provided to the NAND gate 214 via the MCLK input corresponds to the master clock signal clko depicted in FIG. 3. As described above, the output of the NAND gate 214 de-activates/activates the switch 216 to charge/discharge the capacitor 219. In the illustrated embodiment, a predetermined value of the capacitor 219 and a predetermined level of the capacitor charging current are selected so that (1) upon receiving the clock pulses of the $1^{st}$ through $11^{th}$ cycles of the master clock signal clko via the NAND gate 214, the sync circuit 207 does not allow the capacitor voltage to exceed the threshold voltage at the inverting input of the comparator 224, and (2) upon receiving the high logic level of the synchronizing state during the $12^{th}$ clock cycle, the switch 216 is de-activated for a sufficient time to allow the voltage of the charging capacitor to exceed the comparator threshold voltage, thereby causing the comparator 224 to produce the sync signal.

Figure 4:
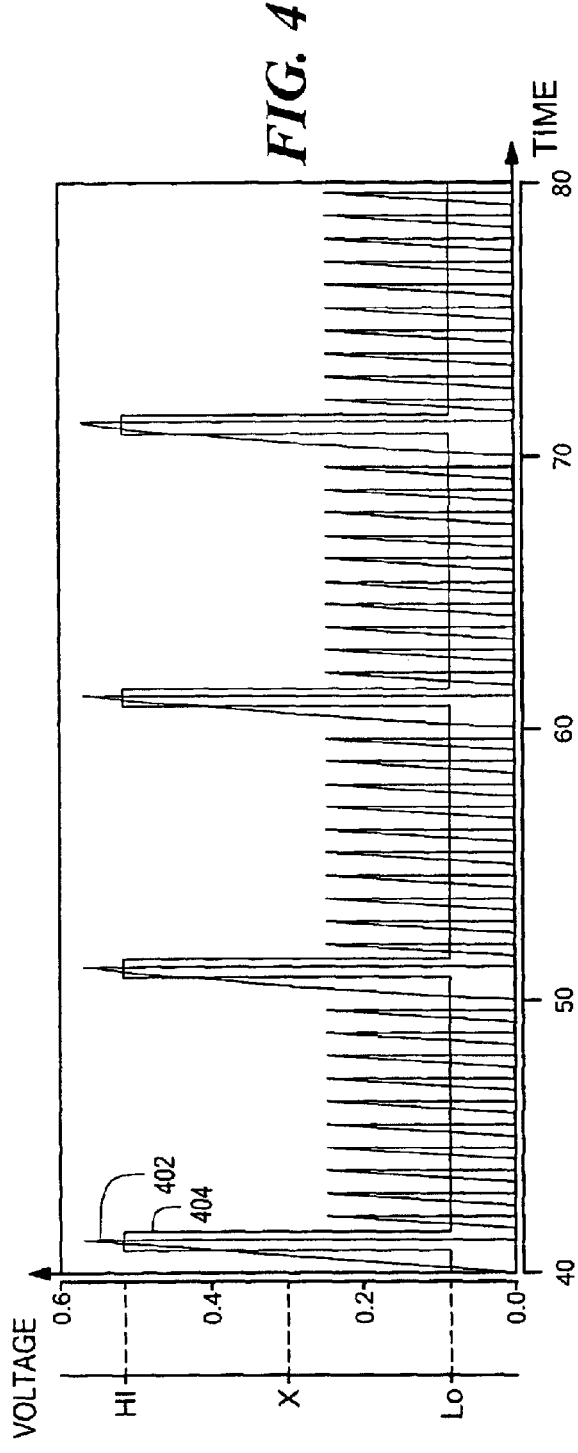
FIG. 4 is a timing diagram illustrating synchronization signals generated by one of the multi-phase controllers included in the multi-phase power system of FIG. 1.

The timing diagram of FIG. 4 depicts the voltage 402 across the capacitor 219 superimposed on the sync signal 404 produced by the comparator 224. As shown in FIG. 4, upon receiving the high logic level of the synchronizing state during every $12^{th}$ clock cycle (e.g., at about 4 μsec, 5 μsec, 6 μsec, and 7 μsec; see FIG. 4), the capacitor voltage 402 increases and eventually exceeds the comparator threshold voltage "X", thereby causing the comparator 224 to produce the high logic level ("Hi") of the sync signal 404. Further, upon receiving the pulses of the remaining cycles of the master clock signal clko, the sync circuit 207 does not allow the capacitor voltage 402 to exceed the comparator threshold voltage X. As a result, the logic level of the sync signal 404 remains low ("Lo").

As shown in FIG. 2, the NAND gate 204 receives the inverse of the signal at the MS input, the sync signal produced by the comparator 224, and the master clock signal clko. Because the sync circuit 207 is operational when the multi-phase controller 200 is programmed as a Slave controller (i.e., when the MS input signal is low), the inverse of the MS signal input is a high logic level. As a result, when the sync signal has a high logic level, the NAND gate 204 allows the master clock signal clko to pass to the DFFs 202.1–202.6 as a "set" signal, which is depicted in FIG. 3 as occurring at times $t_1$–$t_4$. The set signal sets (or resets) the DFFs 202.1–202.6 of the counter 201, thereby synchronizing the multi-phase controller 200 to the master clock signal clko. When the synchronizing state expires on the master clock signal clko, the counter 201 and the control logic circuitry 203 resume normal operation.

Figure 5:
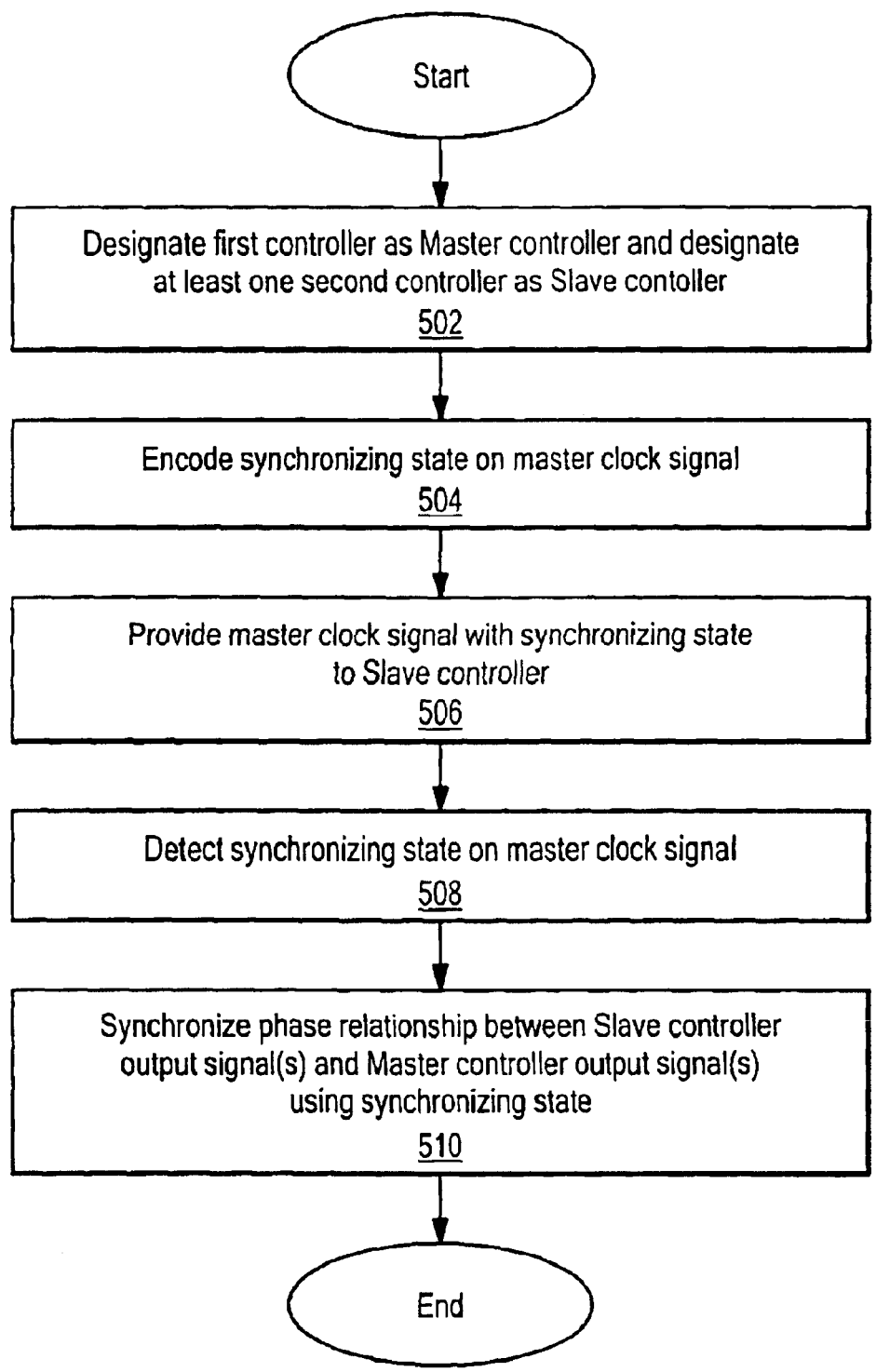
FIG. 5 is a flow diagram illustrating a method of operating the multi-phase power system of FIG. 1.

A method of operating a multi-phase power system including a plurality of multi-phase controllers, as described herein, is illustrated by reference to FIG. 5. As depicted in step 502, a first multi-phase controller is designated as the Master controller, and at least one second multi-phase controller is designated as the Slave controller. Next, the Master controller encodes, as depicted in step 504, a synchronizing state on a master clock signal, and provides, as depicted in step 506, the master clock signal with the synchronizing state to the Slave controller. The Slave controller then detects, as depicted in step 508, the synchronizing state on the master clock signal, and synchronizes, as depicted in step 510, the phase relationship between at least one output signal provided by the Slave controller and at least one output signal provided by the Master controller using the detected synchronizing state. In this way, the clocks and phases of the plurality of multi-phase controllers are synchronized to the single master clock.

The presently disclosed system and method simplifies the synchronization of controllers in a multi-phase power system. As described above, the multi-phase power system 100 (see FIG. 1) can synchronize the clocks and phases of the multi-phase PWM controllers 102.1–102.3 using at most two pins on each controller Integrated Circuit (IC) package, e.g., the MCLK input pin and the MCLKO output pin of the Master controller IC package. Conventional multi-phase power systems may require as many as four or more pins on each controller IC package to perform the synchronization function. As a result, smaller and less costly IC packages may be employed for the controllers 102.1–102.3, thereby allowing the payload to have more PCB area than the power supply in embedded electrical and electronic systems.

It will further be appreciated by those of ordinary skill in the art that modifications to and variations of the above-described distributing clock and programming phase shift in multi-phase parallelable converters may be made without departing from the inventive concepts disclosed herein. Accordingly, the invention should not be viewed as limited except as by the scope and spirit of the appended claims.

What is claimed is:

1. A multi-phase power system, comprising:
    a plurality of Pulse Width Modulation (PWM) controllers including a first PWM controller and at least one second PWM controller,
    wherein the first PWM controller is configured to generate at least one first output signal based on a first clock signal, to insert at least one synchronizing pulse into the first clock signal, and to provide the first clock signal including the synchronizing pulse to the second PWM controller, and
    wherein the second PWM controller is configured to generate at least one second output signal based on the first clock signal, and to synchronize the generation of the first and second output signals using the synchronizing pulse within the first clock signal, thereby maintaining a predetermined phase relationship between the first and second output signals.

2. The system of claim 1 wherein the first PWM controller is configured for inserting the synchronizing pulse into the first clock signal during one or more predetermined cycles of the first clock signal.

3. The system of claim 1 wherein the synchronizing pulse has a duration approximately equal to one cycle of the first clock signal.

4. The system of claim 1 wherein each of the first and second PWM controllers is configurable to set a predetermined phase shift between the first and second output signals.

5. The system of claim 1 wherein each controller is configured to generate a plurality of output signals and configurable to set predetermined phase shifts between the output signals.

6. The system of claim 1 wherein each controller comprises a multi-phase PWM controller.

7. The system of claim 1 wherein each PWM controller includes a counter and control logic circuitry operatively coupled to the counter for generating the controller output signals.

8. The system of claim 7 wherein the first PWM controller further includes logic circuitry operatively coupled to the counter for inserting the synchronizing pulse into the first clock signal.

9. The system of claim 7 wherein the second PWM controller further includes synchronization circuitry configured to receive the first clock signal including the synchronizing pulse, and to generate a reset signal based on the synchronizing pulse to reset the counter, thereby synchronizing the generation of the first and second output signals.

10. A method of operating a multi-phase power system including a plurality of Pulse Width Modulation (PWM) controllers, comprising the steps of:
    generating at least one first output signal based on a first clock signal by a first PWM controller;
    inserting at least one synchronizing pulse into the first clock signal by the first PWM controller;
    providing the first clock signal including the synchronizing pulse to at least one second PWM controller by the first PWM controller;
    generating at least one second output signal based on the first clock signal by the second PWM controller; and
    synchronizing the generation of the first and second output signals using the synchronizing pulse within the first clock signal by the second PWM controller, thereby maintaining a predetermined phase relationship between the first and second output signals.

11. The method of claim 10 wherein the inserting step includes inserting the synchronizing pulse into the first clock signal during one or more predetermined cycles of the first clock signal by the first PWM controller.

12. The method of claim 10 further including setting a predetermined phase shift between the first and second output signals by at least one of the first and second PWM controllers.

13. The method of claim 10 further including generating a plurality of output signals by at least one of the first and second PWM controllers, and setting predetermined phase shifts between the output signals.

* * * * *